United States Patent
Ren et al.

(10) Patent No.: US 10,632,688 B2
(45) Date of Patent: Apr. 28, 2020

(54) ONE-STEP STRATEGY FOR ULTRA-FAST AND LOW COST MASS PRODUCTION OF PLASTIC MEMBRANE MICROFLUIDIC CHIPS

(71) Applicants: Hong Kong Baptist University, Hong Kong (HK); The Hong Kong University of Science and Technology, Hong Kong (HK)

(72) Inventors: Kangning Ren, Hong Kong (HK); Dik-Lung Ma, Hong Kong (HK); Chong Hu, Hong Kong (HK); Wanbo Li, Hong Kong (HK); Sheng Lin, Hong Kong (HK); Hongkai Wu, Hong Kong (HK)

(73) Assignees: Hong Kong Baptist University, Hong Kong (HK); THE HONG KONG UNIVERSITY OF SCIENCE AND TECHNOLOGY, Hong Kong (HK)

( * ) Notice: Subject to any disclaimer, the term of this patent is extended or adjusted under 35 U.S.C. 154(b) by 158 days.

(21) Appl. No.: 15/897,131

(22) Filed: Feb. 14, 2018

(65) Prior Publication Data
US 2018/0236719 A1    Aug. 23, 2018

Related U.S. Application Data

(60) Provisional application No. 62/460,142, filed on Feb. 17, 2017.

(51) Int. Cl.
A43B 13/20    (2006.01)
B29D 35/12    (2010.01)
(Continued)

(52) U.S. Cl.
CPC ........ B29C 65/70 (2013.01); B01L 3/502707 (2013.01); B01L 9/527 (2013.01);
(Continued)

(58) Field of Classification Search
CPC ............ B29C 66/71; B29C 2045/0027; B29C 45/0025; B29C 65/00; B29C 66/91945; B29C 39/148; B29C 43/222; B29C 59/02; B29C 59/022; B29C 59/10; B29C 59/14; B29C 65/48; B29C 65/483; B29C 66/7212; B29C 35/02; B29C 37/0025; B29C 43/021; B29C 43/04; B29C 51/00; B29C 59/16;
(Continued)

(56) References Cited

U.S. PATENT DOCUMENTS

2012/0195810 A1*    8/2012    Cohen ............... B01L 3/502738
422/502

OTHER PUBLICATIONS

Roy et al, Thermal bonding of microfluidic devices: Factors that affect interfacial strength of similar and dissimilar cyclic olefin copolymers, 2011, Sensors and Actuators, B 161, 1067-1073. (Year: 2011).*

(Continued)

*Primary Examiner* — Michael N Orlando
*Assistant Examiner* — Abhishek A Patwardhan
(74) *Attorney, Agent, or Firm* — Idea Intellectual Limited; Margaret A. Burke; Sam T. Yip

(57) ABSTRACT

A method for fabricating flexible microfluidic chips with plastic membranes. In particular, the present invention provides a single-step method for microchannel fabrication of microfluidic chips in a fast and cost-efficient manner.

13 Claims, 22 Drawing Sheets

(51) Int. Cl.
| | |
|---|---|
| *B29C 49/58* | (2006.01) |
| *B29L 31/50* | (2006.01) |
| *B29K 75/00* | (2006.01) |
| *B29C 49/00* | (2006.01) |
| *B29C 65/70* | (2006.01) |
| *B32B 27/08* | (2006.01) |
| *B32B 27/32* | (2006.01) |
| *B32B 27/36* | (2006.01) |
| *B32B 27/30* | (2006.01) |
| *B01L 3/00* | (2006.01) |
| *B01L 9/00* | (2006.01) |
| *B29C 59/02* | (2006.01) |
| *B29K 23/00* | (2006.01) |
| *B29K 67/00* | (2006.01) |
| *B29L 9/00* | (2006.01) |
| *B29L 22/00* | (2006.01) |

(52) U.S. Cl.
CPC .............. *B29C 59/02* (2013.01); *B32B 27/08* (2013.01); *B32B 27/306* (2013.01); *B32B 27/32* (2013.01); *B32B 27/36* (2013.01); *B01L 2300/0816* (2013.01); *B29C 2059/023* (2013.01); *B29K 2023/0633* (2013.01); *B29K 2023/083* (2013.01); *B29K 2067/003* (2013.01); *B29K 2827/18* (2013.01); *B29K 2883/00* (2013.01); *B29L 2009/00* (2013.01); *B29L 2022/00* (2013.01)

(58) Field of Classification Search
CPC ... B29C 66/02; B29C 66/026; B29C 66/1122; B29C 66/53461; B29C 66/73117; B29C 66/91411; B29C 66/91645; B29C 66/919; B29C 71/0081; B29C 2059/023; B29C 33/3842; B29C 33/3878; B29C 33/405; B29C 33/42; B29C 43/003; B29C 45/0001; B29C 48/022; B29C 59/04; B29C 65/006; B29C 65/008; B29C 65/02; B29C 65/08; B29C 65/1406; B29C 65/1409; B29C 65/1412; B29C 65/1425; B29C 65/16; B29C 65/1635; B29C 65/1696; B29C 65/4815; B29C 65/484; B29C 65/4895; B29C 65/70; B29C 66/004; B29C 66/54
USPC .................................. 156/245, 83, 290, 292
See application file for complete search history.

(56) References Cited

OTHER PUBLICATIONS

DeVoe et al, Bonding of Thermoplastic polymer microfluidics, 2008, Microfluid Nanofluid. vol. 6, 1-16. (Year: 2008).*
Tsao, Polymer Microfluidics: Simple, Low-Cost Fabrication Process Bridging Academic Lab Research to Commercialized Production, MIcromachines, &, (Year: 2016).*
White Paper: Acrylic Structural Adhesive Features & Recent Advancements, 3M, 2015 (Year: 2015).*
3M Optically Clear Adhesive 8142 Technical Data, 2010 (Year: 2010).*
Dik-Lung Ma et. al., "G-quadruplex-based logic gates for HgII and AgI ions employing a luminescent iridium(III) complex and extension of metal-mediated base pairs by polymerase", Journal of Materials Chemistry B, 2015, 3, p. 4780-4785.
Chong Hu et. al., "A one-step strategy for ultra-fast and low-cost mass production of plastic membrane microfluidic chips", Lab on a Chip, 2016, 16(20), p. 3847-4038.

* cited by examiner

ONE-STEP STRATEGY FOR ULTRA-FAST AND LOW COST MASS PRODUCTION OF PLASTIC MEMBRANE MICROFLUIDIC CHIPS

CROSS-REFERENCE TO RELATED APPLICATIONS

This application claims priority from U.S. Provisional Patent Application No. 62/460,142 filed on Feb. 17, 2017, the disclosure of which is hereby incorporated by reference in its entirety.

FIELD OF INVENTION

The present invention relates to a method for fabricating flexible microfluidic chips with plastic membranes. In particular, the present invention provides a single-step method for fabricating microchannels in microfluidic chips in a fast and cost-efficient manner.

BACKGROUND OF INVENTION

With the advances in chip materials and corresponding fabrication technologies, microfluidics chip has been used in many important new functions and become enabling tools in various fields of research. The conventional strategy for fabricating microfluidic chips involves two steps: generating channel structures in a flat substrate, and sealing of the channels with a roof. This strategy is first employed to fabricate silicon and glass microfluidic chips with photolithographic technologies used in the semiconductor industry. The conventional methods are costly (tens to hundreds of dollars per chip), but resistant to heat and solvents, and could produce very small channels when silicon is used. Subsequently, polymer-based microfluidic chips are developed, using polydimethylsiloxane (PDMS), poly (methyl methacrylate) (PMMA), polycarbonate (PC), polyethylene (PE), polyimide, polystyrene, poly(vinyl chloride), cyclic olefin copolymer and hydrogels, which simplify the fabrication process, reduce the cost of production, and extend the functions of devices, e.g., on-chip valve control and cell culture. Accordingly, different microfabrication techniques are used, such as replica molding, injection molding, thermoforming and hot-embossing. These devices have become important new tools in various research fields; however, the two-step fabrication strategy inherently raised the cost and limited the throughput of production, e.g., the bonding of polymer chips is normally accomplished with oxygen plasma treatment, nanometer-thick glue layer, dissolving solvent, or melt-bonding, et al.

Besides the two-step fabrication strategy, there are also single-step strategies reported, which make fabrication of 3D microchannel structures possible. For example, one way is to use sacrificial templates to determine the internal shape of the channels. But the removal of the templates is normally time-consuming and often involves organic solvents or extreme conditions such as high temperature. 3D printing has been employed as another single-step fabrication strategy, but it is still costly and unsuitable for large scale production because of the relatively slow printing speed.

While the aforementioned methods have found numerous applications in research laboratories, few commercial products have been launched, mainly obstructed by the cost of fabrication, reliability of devices for use and storage, as well as the apparatus needed for operating the system. With regards to the demand of cost-effective devices for commercial applications, some smart designs of paper based microfluidic devices have been reported. Because paper can hold water in it, simply printing hydrophobic materials onto certain area of a piece of paper, the remaining area on the paper can serve as microfluidic channels without the need of sealing the channel roof. This strategy is very useful for bioassays that require passive pumping; nevertheless, it sometimes faces problems of sample retention and limited feature resolution, and the roof-less channels are less suitable for certain applications involving heating, volatile solvents, or particles/droplets/beads, etc. In addition, it is not easy to manufacture on-demand valving and pumping on chip. For such applications, a solution to produce affordable microfluidic devices is still in high demand.

When considering the possibility of any new strategy to fabricate microfluidic devices in a really fast and cost-efficient manner, the inventors were attracted by the methods for commercial production of plastic bags for packaging foods, and that for sealing documents using plastic covers. The former uses flexible plastic films, e.g., PE, and the latter uses rigid plastic films, e.g., EVA coated PET; but both employ a hot press to bond the two membranes at the boundary, which only takes a few seconds. Interested by the extremely high speed and low cost of such processes, the inventors did some preliminary attempts to see if a similar strategy could be introduced for the fabrication of microfluidic devices. Unfortunately, the adoption of either strategy was unsuccessful; however, the attempts inspired the inventors to create a new strategy. Interestingly, the inventors found that the combination of a soft film and a rigid film, with the help of a special stamp for heat bonding, generate microchannels as the soft film rises up when being heated, allowing the fabrication of microchannels in a single hot-pressing step, with the speed and cost just like those to seal a plastic bag. The mechanism of this fabrication strategy is different from the previously reported strategies for fabricating microchannels, e.g., hot-embossing, thermoforming, etc.

Herein the inventors describe a novel method for manufacturing microfluidic chips, which is super-fast (within 12 seconds per piece) and extremely cost-effective (less than $0.02 per piece). Different from the conventional two-step strategy for fabricating sealed microchannels, the present application provides a method that generates microchannels in a single step.

It is an object of the present invention to provide an ultra-fast, extremely cost-effective, and environmental friendly method for fabricating flexible microfluidic chips with plastic membranes.

Citation or identification of any reference in this section or any other section of this application shall not be construed as an admission that such reference is available as prior art for the present application.

SUMMARY OF INVENTION

Accordingly, an objective of the invention relates to a method for fabricating flexible microfluidic chips with plastic membranes. In particular, the present invention provides a single-step method for microchannel fabrication of microfluidic chips in a fast and cost-efficient manner.

A method to manufacture a microfluidic chip comprising providing a negative mold, a thermal expanding membrane, a thermal adhesive membrane and a thermal resistant membrane; layering the three membranes on a compressible substrate, wherein the thermal resistant membrane is layered on top of the compressible substrate and the thermal expanding membrane is layered on top of the thermal resistant membrane with the thermal adhesive membrane sandwiched between the thermal expanding and thermal resistant membranes; heating the negative mold to a temperature sufficient to seal the three membranes; and contacting the heated negative mold with the thermal expanding membrane at a pressure sufficient to seal the three membranes. The negative mold holds a pattern negative to the microfluidic chip to be manufactured and has a melting point higher than the membranes to be sealed, wherein the thermal expanding membrane expands to form channels in regions that is not in contact with the heated negative mold, and wherein the thermal expanding membrane is in contact with the heated negative mold for 5-25 seconds.

In one embodiment, said compressible substrate is selected from the group consisting of cis-1,4-polyisoprene natural rubber, trans-1,4-polyisoprene gutta-percha, synthetic polyisoprene, polybutadiene, chloroprene rubber, polychloroprene, neoprene, baypren, butyl rubber, halogenated butyl rubber, styrene-butadiene rubber, nitrile rubber, hydrogenated nitrile rubber, ethylene propylene rubber, ethylene propylene diene rubber, epichlorohydrin rubber, polyacrylic rubber, silicone rubber, fluorosilicone rubber, fluoroelastomers, perfluoroelastomers, polyether block amides, chlorosulfonated polyethylene and ethylene-vinyl acetate.

In one embodiment, said compressible substrate is a cured polydimethylsiloxane (PDMS) of 1-30: 3-1 prepolymer to a curing agent. In another embodiment, said compressible substrate is a 20:1 cured PDMS.

In one embodiment, said pressure sufficient to seal the three membranes is at least 0.6 MPa. The temperature sufficient to seal the three membranes is 100° C.-200° C. In an embodiment, said temperature is 122° C.-132° C.

In one embodiment, the heated negative mold is in contact with the membranes for at least 5 seconds to 25 seconds. In yet another embodiment, the heated negative mold is in contact with the membranes for at least 8 seconds to 16 seconds.

In one embodiment, the thermal expanding membrane is selected from LDPE, polypropylene and polyvinyl chloride. The thermal adhesive membrane is selected from EVA, polyethylene, poly(methyl methacrylate) and polylactic acid. The thermal resistant membrane is selected from PET, polycarbonate, polyether sulfone, polyoxymethylene, polyether ether ketone, polyetherimide, polyphenylene sulfide and acrylonitrile butadiene styrene. The negative mold is selected from PFA, polytetrafluoroethylene, fluorinated ethylene propylene, ethylene tetrafluoroethylene, polyvinylidene fluoride, polyamides and polyether ether ketone.

In one embodiment, the thermal expanding membrane has a thermal expansion coefficient of approximately $250 \times 10^{-6}$/° C., the thermal resistant membrane has a melting point of above 200° C. and a thermal expansion coefficient of approximately $70 \times 10^{-6}$/° C. and the thermal adhesive membrane has a melting point lower than the thermal resistant membrane.

Throughout this specification, unless the context requires otherwise, the word "include" or "comprise" or variations such as "includes" or "comprises" or "comprising", will be understood to imply the inclusion of a stated integer or group of integers but not the exclusion of any other integer or group of integers. It is also noted that in this disclosure and particularly in the claims and/or paragraphs, terms such as "included", "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the present invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the present invention and apply throughout. Unless otherwise defined, all other technical terms used herein have the same meaning as commonly understood to one of ordinary skill in the art to which the present invention belongs.

Other aspects and advantages of the present invention will be apparent to those skilled in the art from a review of the ensuing description.

BRIEF DESCRIPTION OF DRAWINGS

The above and other objects and features of the present invention will become apparent from the following description of the present invention, when taken in conjunction with the accompanying drawings, in which.

DETAILED DESCRIPTION OF THE INVENTION

Figure 1:
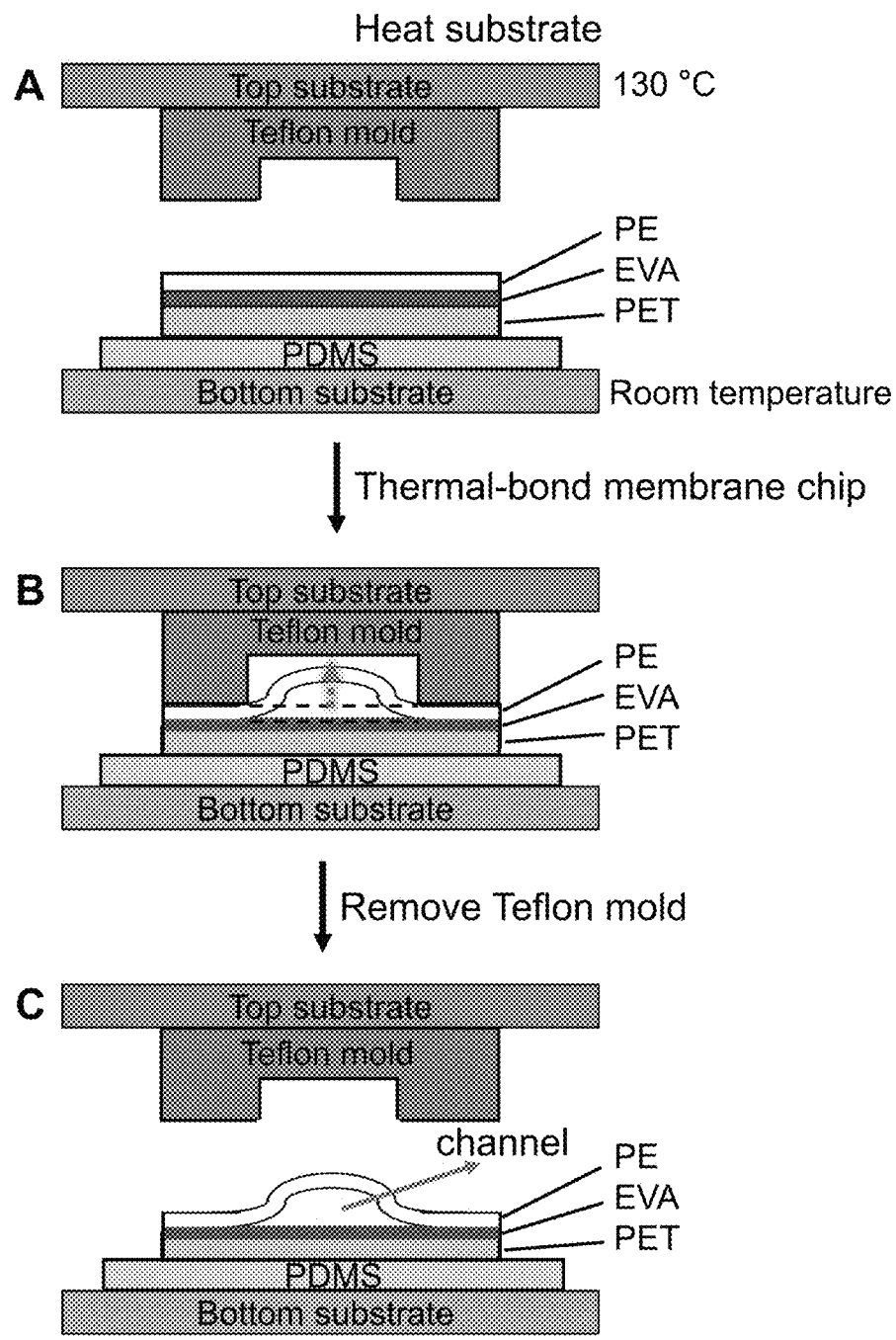
FIG. 1 shows the schematic of one-step fabrication of plastic membrane microfluidic chips of the present invention. (A) Preheating the Teflon mold. The Teflon negative mold, which is fixed on the top heater of the hot embosser (top substrate), is firstly preheated to 130° C.; a PE membrane (on top) and a hybrid of EVA/PET membrane (at the bottom) are stacked coaxially and placed on the PDMS-coated lower stage of the embosser (bottom substrate), which is set to room temperature (RT). (B) Thermal-bonding the membrane chip. In the thermal-bonding process, the upper heater moves down and presses the membranes, and channels (dotted arrow) are formed in the area that have not been pressed. (C) Removing the Teflon mold. After pressing, the top heater and Teflon mold are lifted and separated from the prepared plastic membrane chip.

The present invention is further illustrated by the following embodiments and examples which may only be used for illustrative purpose but are not intended to limit the scope of the presently-claimed invention.

In the present invention, a method to manufacture microfluidic chip is provided. The present method comprising providing a negative mold, a thermal expanding membrane, a thermal adhesive membrane and a thermal resistant membrane. The three membranes are layered on a compressible substrate, wherein the thermal resistant membrane is layered on top of the compressible substrate and the thermal expanding membrane is layered on top of the thermal resistant membrane with the thermal adhesive membrane sandwiched between the thermal expanding and thermal resistant membranes. The negative mold is heated to a temperature sufficient to seal the three membranes; and make contacts with the thermal expanding membrane at a pressure sufficient to seal the three membranes. The negative mold holds a pattern negative to microchannels of the microfluidic chip to be manufactured and has a melting point higher than the membranes to be sealed, and wherein the thermal expanding membrane expands to form channels in regions that is not in contact with the heated negative mold.

In one embodiment, a perfluoropolymer perfluoroalkoxy (PFA) (often called Teflon PFA; Teflon is the brand name of the product of DuPont) negative mold is used as a stamp to thermally bond the plastic membranes. The thermal expanding membrane which is the channel-forming layer is a low density polyethylene (LDPE) membrane; and the thermal resistant membrane is a polyethylene terephthalate (PET) membrane coated with the adhesive membrane made of ethylene-vinyl acetate copolymer (EVA). The LDPE membrane is placed on top of the EVA and PET membrane. During the fabrication process, the pre-heated PFA mold presses the layered membranes; because of LDPE membrane's relatively large thermal expansion coefficient, the LDPE layer rises up at the area not being pressed, and forms microfluidic channels; in the meantime, the LDPE area being pressed bonds with the molten EVA/PET layer and seals the channels. The two regions (pressed and unpressed)

of LDPE membrane are clearly distinguishable even at micrometer scale. The present method can fabricate microchannels with width down to 50 micron.

In the present invention, formation of clear channels and strong bonding of polymer membranes are successfully achieved within seconds, and the non-stick PFA mold readily separates from the chip, making the present method very convenient and easy to scale up. Also, involving no reagent or waste, the present method is extremely energy efficient and environmental friendly.

Flexible membrane chips prepared according to the present method can be used for, but not limited to, valve operation, formation of droplets, capillary electrophoresis separation. Flexible membrane chips prepared according to the present method can also use for on-chip pumping operation for quantitative delivery of volatile solvents. In addition, membrane chip prepared by the present method is demonstrated for use in portable, disposable, pump-free detection of lead ions in water samples. The present method of fabricating microfluidic chip is ultra-fast, ultra-low cost, mass producible, environmental friendly and can bring new opportunities for the commercial implementations of microfluidic technologies.

The present invention provides a novel method capable of mass producing microfluidic chips at very high speed and low cost. The present invention fabricates microfluidic chip made of flexible plastic membrane in a single step within a few seconds.

FIG. 1 illustrates one embodiment of the present method. First, a PFA negative mold is fixed on a top moving stage (labelled as top substrate in the FIG. 1) of the embosser and preheated to 130° C. Three plastic membranes, e.g. a low density polyethylene (LDPE) thermal expanding membrane and a ethylene vinyl acetate (EVA) thermal adhesive membrane-coated polyethylene terephthalate (PET) thermal resistant membrane, are layered on the bottom stage of the embosser (bottom substrate in FIG. 1) which was set at room temperature. The top stage moves downward and the heated PFA mold presses the plastic membranes. The area of the membranes being pressed by the PFA mold seals into one piece; the area of membranes not being pressed rises up and forms microchannels owing to the thermal expansion of the LDPE membrane. The cross-sections of formed channels have a generally curved shape. Other shapes may be formed. The channel formed by the present method is different from thermoforming. Conventional thermoforming uses pressurized chambers to deform heated membrane, which is much more complicated than the present method.

After formation of the channels, the top stage quickly retracts, the non-stick Teflon PFA mold separates from the membrane. The membranes are not fixed to the bottom stage. The present method can be used to fabricate chips with two layers of channels, one layer on each side of the PET membrane. To connect the two layers of channels, access holes have to be made in the PET membrane before bonding, and the access holes must be aligned with the channels during bonding.

Figure 2A:
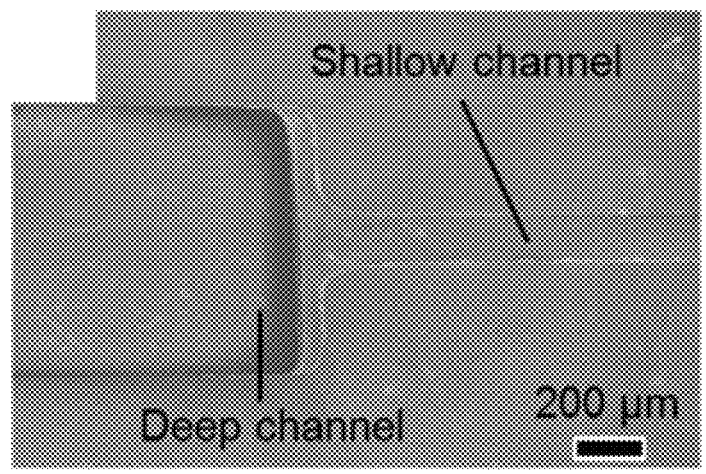
FIG. 2A shows SEM characterization of Teflon negative mold.

The present method comprises preparing the negative mold for use as a stamp to thermally bond the plastic membranes. The mold of the present invention should fulfil several requirements. The mold distributes uniform/even pressure to the area to be sealed, and quickly transfer heat to the pressed area to ensure localized heating. The mold does not stick to the plastic membrane so that after pressing it can be easily released from the chip. The mold should also have a melting point much higher than the plastic membranes used for fabricating the chip, and sufficient mechanical strength to maintain the structure of the micropatterns when heated up. Suitable materials for negative mold in the present invention include, but are not limited to, perfluoropolymer perfluoroalkoxy (PFA), polytetrafluoroethylene (PTEE), fluorinated ethylene propylene (FEP), ethylene tetrafluoroethylene (ETFE), polyvinylidene fluoride (PVDF), polyamides (nylon) and polyether ether ketone (PEEK). Teflon molds as described in Whole-Teflon microfluidic chips; PNAS May 17, 2011, vol. 108, no. 20, 8162-8166 is preferred. Known for its non-stick property, perfluoropolymers have been broadly used to assist mold releasing; also, it has excellent thermostability and acceptable thermoconductivity, and thus has been widely used for cookware coating. In contrast, the inventors found molds prepared with other materials (Table 1), e.g., PDMS, PMMA, glass and metal, either has insufficient thermoconductivity or cannot easily separate from the bonded plastic chip after hot pressing. FIG. 2A presents SEM image of Teflon negative molds the inventors used in the fabrication.

TABLE 1

Tested materials as the mold for fabricating microfluidic chip by single-step hot pressing of the present invention.

| | Performances | | | |
|---|---|---|---|---|
| Materials | Melting temperature (° C.) | Thermal conductivity | Nonstick to LDPE film | Suitable for forming microchannel |
| Teflon PFA | 240-260 | Good | Good | Yes |
| PS/PMMA | 130-140 | Fair | Poor | No |
| PDMS | N/A | Poor | Poor | No |
| Glass | N/A | Good | Poor | No |
| Metal (Al) | 660 | Good | Poor | No |

Materials suitable for the thermal expanding membrane of the present method of fabricating microchannel include, but are not limited to, low density polyethylene (LDPE), polypropylene (PP) and polyvinyl chloride (PVC). The thermal expanding membrane for channel formation requires low rigidity and high thermal expansion coefficient which allows it to expand and rise up when heated to form channels. The thermal expansion coefficient of the thermal expanding membrane is preferably $250 \times 10^{-6}/°$ C. The thermal resistant membrane of the present method requires high melting point and low thermal expansion coefficient as well as good mechanical strength. In one embodiment, the thermal resistant membrane has a melting point of above 200° C. and a thermal expansion coefficient of $70 \times 10^{-6}/°$ C. Materials of thermal resistant membrane suitable for use in the present method include, but are not limited to, polyethylene terephthalate (PET), polycarbonate (PC), polyether sulfone (PES), polyoxymethylene (POM), polyether ether ketone (PEEK), polyetherimide (PEI), polyphenylene sulfide (PPS) and acrylonitrile butadiene styrene (ABS). In the present method, an adhesive membrane is layered between the thermal expanding and thermal resistant membranes. Suitable adhesive membrane includes, but is not limited to, ethylene-vinyl acetate copolymer (EVA), polystyrene (PS), poly(methyl methacrylate) (PMMA) and polylactic acid (PLA). In one embodiment, EVA is the adhesive layer to adhere the thermal expanding membrane and the thermal resistant membrane. The inventors tried to simply use two pieces of LDPE membranes, just like what are used for producing bubble films, to fabricate the chips. However, the inventors never obtained acceptable result despite adjusting the temperature, pressure, and time length for bonding; the chips were either easy to split, or completely merged and lost the channel structure.

Figure 2B:
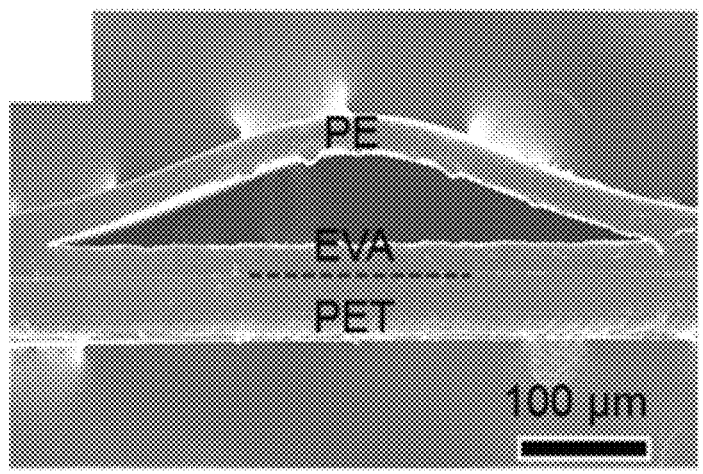
FIG. 2B shows the cross-section of prepared plastic membrane chip.

In one embodiment, EVA coated PET membrane is used as the substrate membrane. In this hybrid film, the PET layer, which is rigid and has a high melting point between 250° C. and 260° C., is used to provide mechanical support that keeps the shape of the channel pattern as it would not shrink when heated; the EVA layer, which has a low melting point of around 100° C., is used as an adhesive layer to bond the upper LDPE layer to the PET layer at the area pressed during the hot-pressing process. Owing to its high thermal expansion coefficient, LDPE film rises up to the negative mold to form semi-rounded channel, while the PET layer remains flat. With this combination, strong bonding of the chip with clear channel feature was achieved after the hot pressing. FIG. 2B shows a SEM image of the cross-section of the channel prepared by the present method.

Another practical issue addressed by the present method is the alignment of the working surfaces (the Teflon mold and the supporting surface for the plastic membranes) to ensure uniform pressure distribution to the area to be bonded. Because the membranes are only ~100 µm thick in total, the inventors found that the microfluidic chip fail to seal when there is small misalignment of the two stages of the hot embosser due to the uneven pressure to the membranes.

To address this challenge, the present method includes a PDMS membrane as a compressible substrate (FIG. 1), which helps to balance the pressure of the Teflon mold to the plastic membranes. The compressible substrate solves the problem of uneven pressure distribution from misalignment. The compressible substrate is elastic and includes, but is not limited to, cis-1,4-polyisoprene natural rubber, trans-1,4-polyisoprene gutta-percha, synthetic polyisoprene, polybutadiene, chloroprene rubber, polychloroprene, neoprene, baypren, butyl rubber, halogenated butyl rubber, styrene-butadiene rubber, nitrile rubber, hydrogenated nitrile rubber, ethylene propylene rubber, ethylene propylene diene rubber, epichlorohydrin rubber, polyacrylic rubber, silicone rubber, fluorosilicone rubber, fluoroelastomers, perfluoroelastomers, polyether block amides, chlorosulfonated polyethylene and ethylene-vinyl acetate. The inventors adopt a nonstandard formulation of PDMS. PDMS suitable for use in the present invention a cured PDMS. The ratio of prepolymer to curing agent of the cured PDMS is 1-30:3:1. In one embodiment, 20:1 cured PDMS is used. Cured PDMS is softer than normal PDMS and thus works better as an automatic pressure regulator. The compressible substrate also serves as a thermal isolate to enhance resolution of the fabricated channel. Thermal isolation at the bottom of the fabricated membrane is needed because the formation of high-resolution channel pattern relies on highly localized distribution of both pressure and heat.

When the inventors put the plastic membranes directly on the metal bottom stage of the embosser, which is a good thermal conductor, the non-pressed area of the membranes tend to partially bond as well, presumably because the heat is transferred to the non-pressed area through the thermal conducting substrate. To achieve best performance of the method, the inventors investigate the effects of several key factors including pressure, temperature, and duration of pressing. All the three parameters affect the cross-section profile of the formed channels. High bonding pressure is helpful to seal the plastic films firmly with high resolution of patterns. In one embodiment, the membranes are sealed under 0.6 MPa (note that to keep the pressure constant, the force applied depends on the size of the Teflon mold). While a sufficient bonding pressure is able to seal the membrane, it is seen that bonding result is more sensitive to the bonding temperature and the pressing time.

Figure 2C:
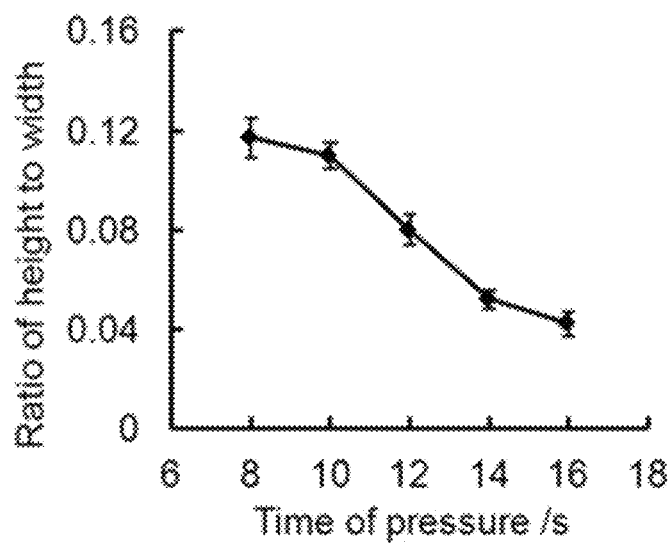
FIG. 2C shows the plot of equivalent heights (height to width) for 800-μm wide microchannel versus time of pressure at fixed temperature of 131° C. The pressure used for the experiments is 0.6 MPa.
Figure 2D:
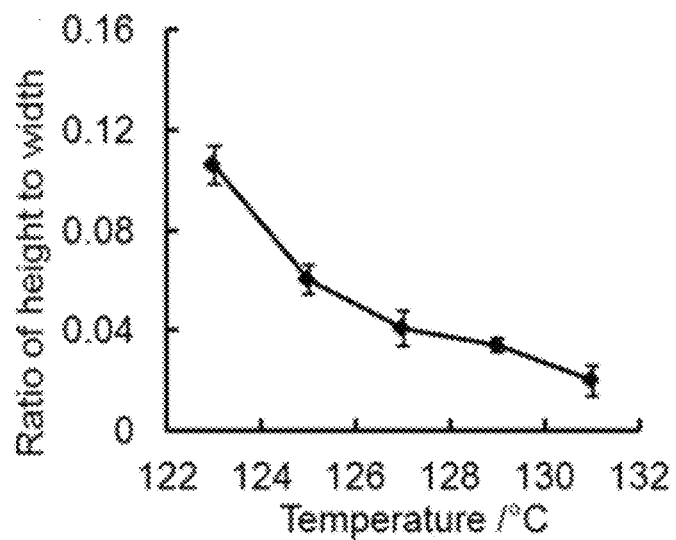
FIG. 2D shows the plot of equivalent heights (height to width) versus temperature with fixed duration of pressure for 10 seconds. The pressure used for the experiments is 0.6 MPa.

The bonding temperature needs to be high enough to melt the adhesive membrane (e.g. EVA), but not too high to result in formation of channels. The pressing duration shows similar impact. Insufficient pressing time could not achieve sufficient bonding strength, while pressing the membranes for too long cause the channels to collapse. As shown in FIGS. 2A to 2D, 800 µm-wide channels under a series of conditions are sealed, and cross-sections of the channels are inspected. FIG. 2C and FIG. 2D show that the equivalent heights of channels (the ratio of peak height to channel width) decrease as the temperature and/or the pressing time increase. In one embodiment, the membranes are sealed at 100° C.-200° C. In another embodiment, the membranes are sealed at 122° C.-132° C. In one embodiment, the membranes are in contact with the heated mold for 5 s to 25 s. In another embodiment, the membranes are in contact with the heated mold for 8 s to 16 s. The pressure used for all the above experiments is 0.6 MPa. In this way, the cross-sectional profile of the channels could be tuned with different combination of bonding conditions.

Figure 3A:
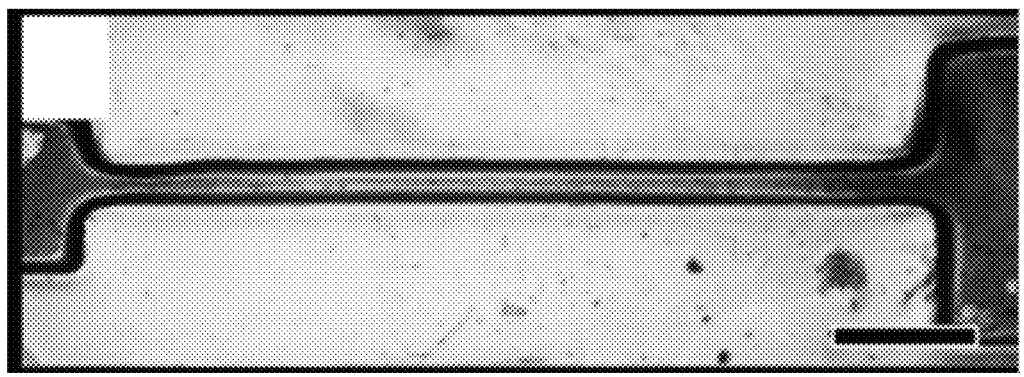
FIG. 3A shows the channel (filled with crystal violet dye) was fabricated using 20-μm thick LDPE membrane in a test of the fabrication performance with PE membranes of different thicknesses. Scale bars are 250 μm.
Figure 3B:
FIG. 3B shows the channels are merged (circled) with bottom EVA coated PET layer using 10-μm thick cling wrap in a test of the fabrication performance with PE membranes of different thicknesses. Scale bars are 250 μm.
Figure 4A:
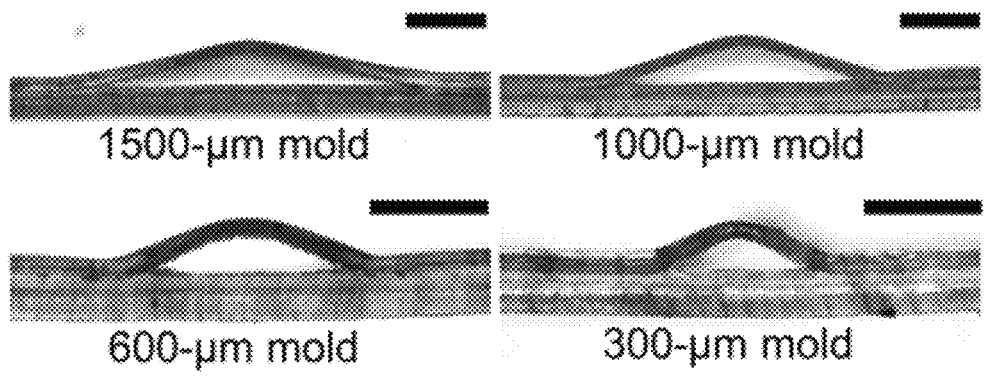
FIG. 4A shows the dependence of the channel profile on the width of the mold. Scale bars are 200 μm.
Figure 4B:
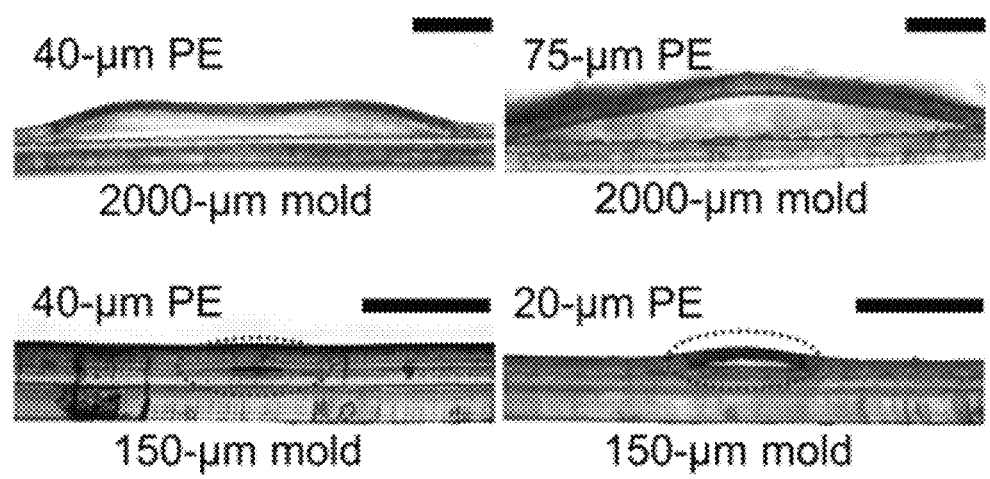
FIG. 4B shows the dependence of the channel profile on the thickness of the channel roof made of a PE membrane. Scale bars are 200 μm.
Figure 4C:
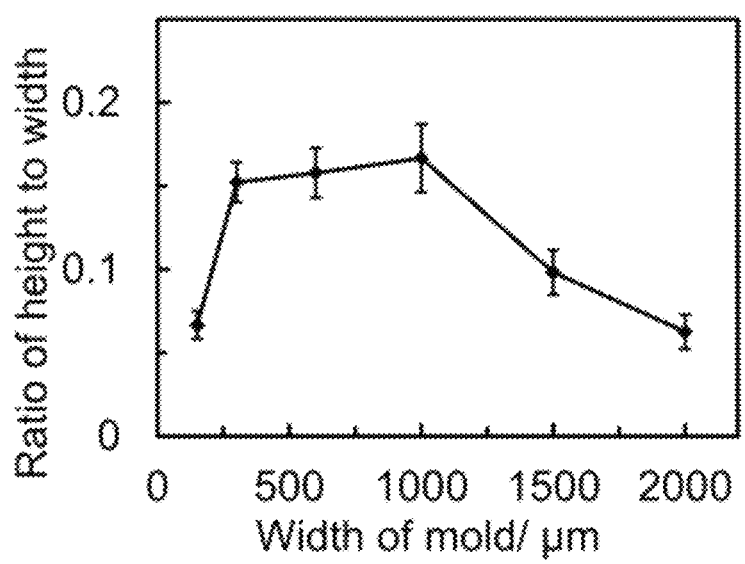
FIG. 4C shows the peak height to width ratio of fabricated channels shown in FIG. 4A.

Meanwhile, when the width of the channel is increased gradually, the height of the channel first increased and then become stabilized, resulting in height-to-width ratios that first increased and then slowly decreased (FIGS. 4A to 4D). When the channel width reaches about 50 times of the thickness of the PE membrane (the roof of the channel), the formed channels started to collapse (FIG. 4A). When a thicker channel forming membrane is used, the maximum channel width could be further extended. On the other hand, when a thinner channel forming membrane is used, the minimum channel width is further reduced (FIG. 4B). The bonding performance is tested using a liquid perfusion test, it is found that the minimal channel width is around 50 µm, when 20 µm thick PE membrane is used as the channel forming membrane (FIG. 3A). While when 10 µm thick PE membrane is used, the formed channels collapse (FIG. 3B). In general, the height to width ratio of the channel that present method produced ranges from ~0.05 to 0.5 (FIG. 4C).

Figure 5A:
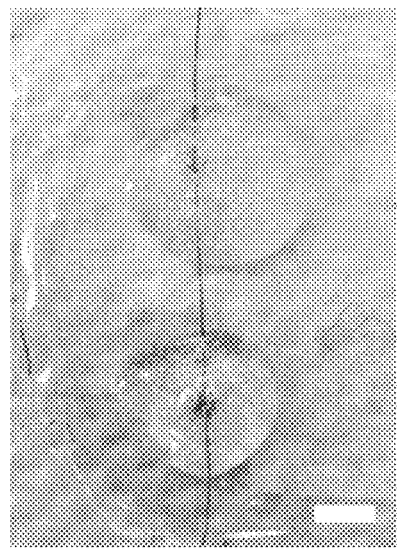
FIG. 5A shows the connection interfaces at the channel inlet and outlet fixed by epoxy glue in a test of the bonding strength of the present method. Scale bars are 2 mm.
Figure 5B:
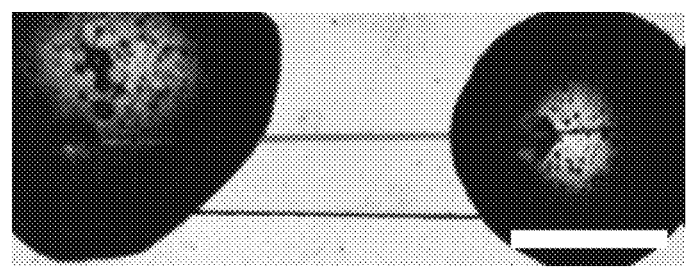
FIG. 5B shows the 100-μm wide microchannel and the connection interfaces are well sealed when the air pressure was up to 290 kPa. Scale bars are 2 mm.
Figure 5C:
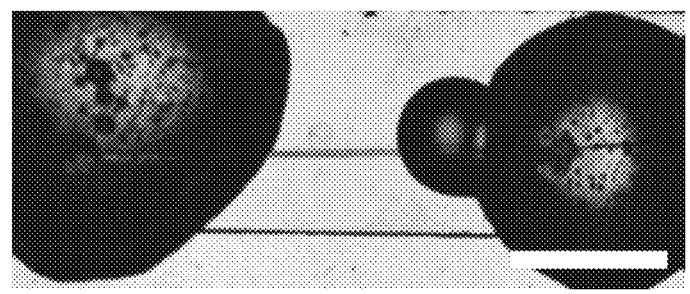
FIG. 5C shows the connecting interface broke (arrow) when the air pressure was 300 kPa, but the microchannel still did not leak. Scale bars are 2 mm.

The bonding strength of plastic microfluidic chip prepared by the present invention is examined using water driven by compressed air. A 100 µm wide straight channel is fabricated and connected to a tube to infuse water (dyed to red) into the channel; then one end of the channel is sealed after the infusion (FIG. 5A). In this dead-end channel, air pressure applied at the end of the tube equals to the pressure of the liquid inside the channel. No leakage is found when the air pressure increases to 300 kPa (FIG. 5B). At above 300 kPa, the connection between the tube and the channel, made with epoxy glue, breaks down while the channels remain intact (FIG. 5C). Therefore, the 100 µm wide channels prepared by the present invention can withstand at least 300 kPa pressure, which is sufficient for most microfluidic applications.

Figure 6A:
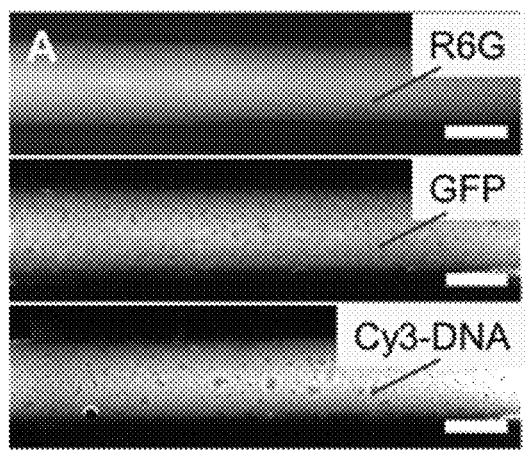
FIG. 6A shows the fluorescence images of the channels after an injection of 0.1 mg/mL Rhodamine 6G (R6G), 0.1 mg/mL GFP and 10 μM Cy3-labelled single-stranded oligonucleotide (Cy3-DNA) into the present plastic membrane chip. (Scale bars represent 200 μm.).
Figure 6B:
FIG. 6B shows the fluorescence images of the channels in FIG. 6A after being washed with water. (Scale bars represent 200 μm.).
Figure 6C:
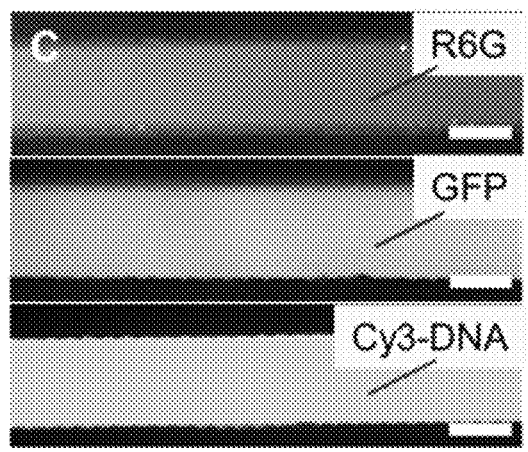
FIG. 6C shows the fluorescence images of the channels after injection of 0.1 mg/mL Rhodamine 6G (R6G), 0.1 mg/mL GFP and 10 μM Cy3-labelled single-stranded oligonucleotide (Cy3-DNA) into a PDMS chip. (Scale bars represent 200 μm.).
Figure 6D:
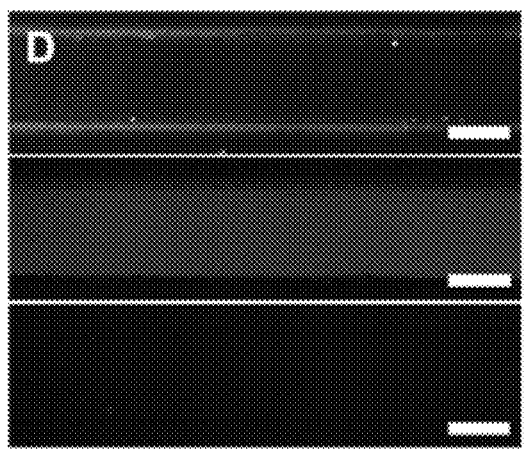
FIG. 6D shows the fluorescence images of channels in FIG. 6C after being washed with water. (Scale bars represent 200 μm.).
Figure 6E:
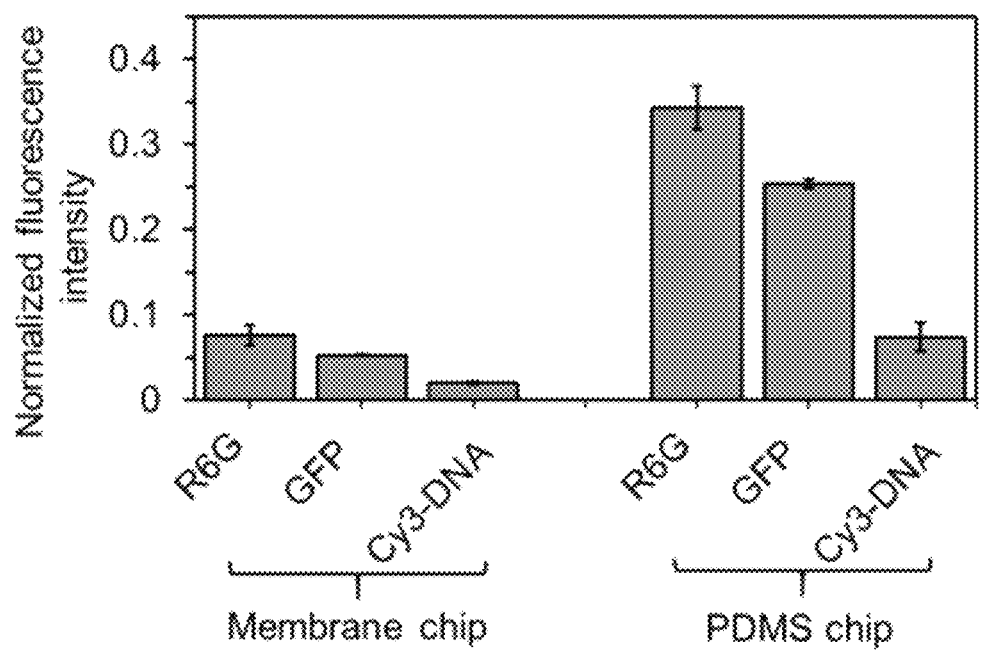
FIG. 6E shows the normalized fluorescence intensity in the channels corresponding to images in FIGS. 6B and 6D. (Scale bars represent 200 μm.).

The resistance of chip prepared by the present invention against the adsorption of different types of molecules is investigated. Rhodamine 6G (R6G), green fluorescent protein (GFP), and Cy3 labelled single-stranded oligonucleotide (Cy3-DNA) are injected into the chip prepared by the present invention (FIGS. 6A and 6B) and PDMS chip (FIGS. 6C and 6D), and then the chips are incubated at room temperature for 10 mins. The channels are washed with water of 100 times volume of the channel. FIG. 6A and FIG. 6B is the chip prepared by the present method before the rinse and after the rinse, respectively. FIG. 6C and FIG. 6D are PDMS chips before the rinse and after the rinse, respectively. The ratios of remaining fluorescence signal after rinsing are shown in FIG. 6E. The remaining signals in the membrane chip of the present invention are weaker than those in the PDMS channel. The lower fluorescence intensity in the present membrane shows acceptable anti-fouling property.

Figure 7A:
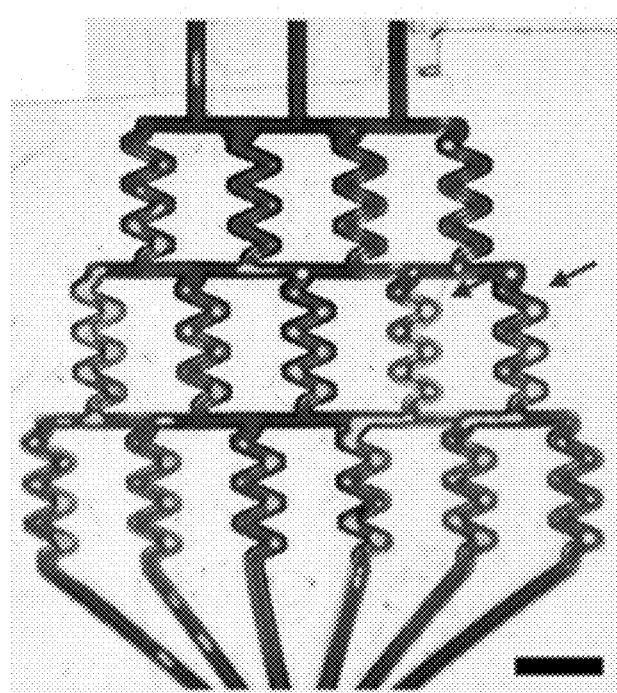
FIG. 7A shows the peristaltic-pumping operations. It is a bright field image of the squeezing operation on a membrane chip. At the beginning of introducing crystal violent dye solution into the microfluidic system, some air bubbles were trapped inside the channels (arrows), especially in the corner of the sinuate channels. Scale bar is 2 mm.
Figure 7B:
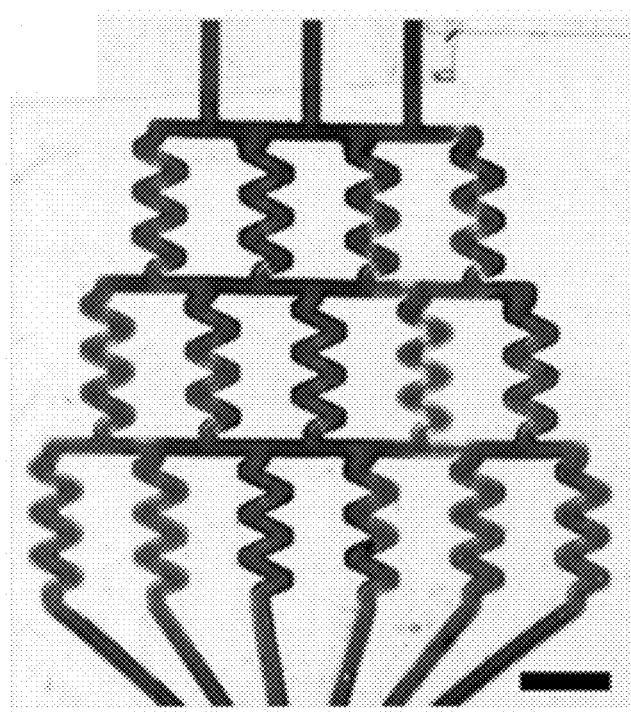
FIG. 7B shows the channels were fully filled with the solution after squeezing the bubbles using a PDMS cylinder. Scale bar is 2 mm.

Functions of the membrane chips in typical microfluidic operations, such as valving, droplets generation, mixing and capillary electrophoresis (CE) are investigated. As the membrane microfluidic chip fabricated with the present method is flexible with a generally curved shape, it is convenient to squeeze the liquid in the channel or block the channel by simply applying force from outside. An example is shown in FIG. 7A: a tree like channel is filled with aqueous solution, some bubbles are trapped in the corners of the channel; the bubbles are easily removed by squeezing or scrapping the channel with an external PDMS slice or increasing the flow rate (FIG. 7B). Chip prepared by the present invention can be fabricated for peristaltic pumping purpose for the delivery of fluids, including volatile solvents. Pipetting accurate amount of liquids is important in analytical procedures but it has been difficult for volatile solvents using commercial pipettes due to the expansion of solvent vapour in the void space of the pipette chamber.

Figure 7C:
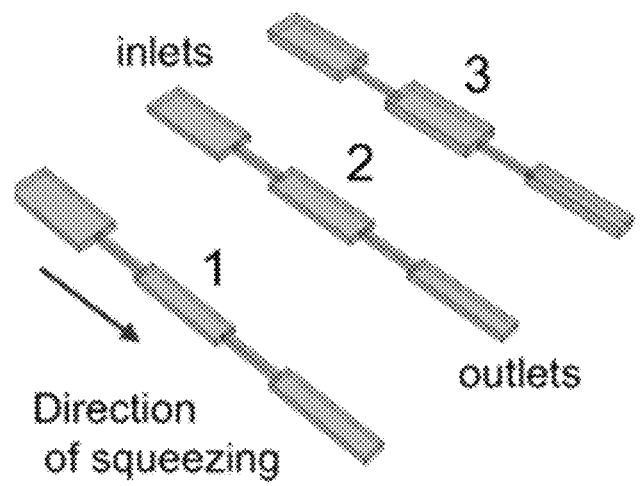
FIG. 7C shows the design of three microfluidic channels 1, 2 and 3 used for peristaltic-pumping operation tests with different volume-determining chambers.
Figure 7D:
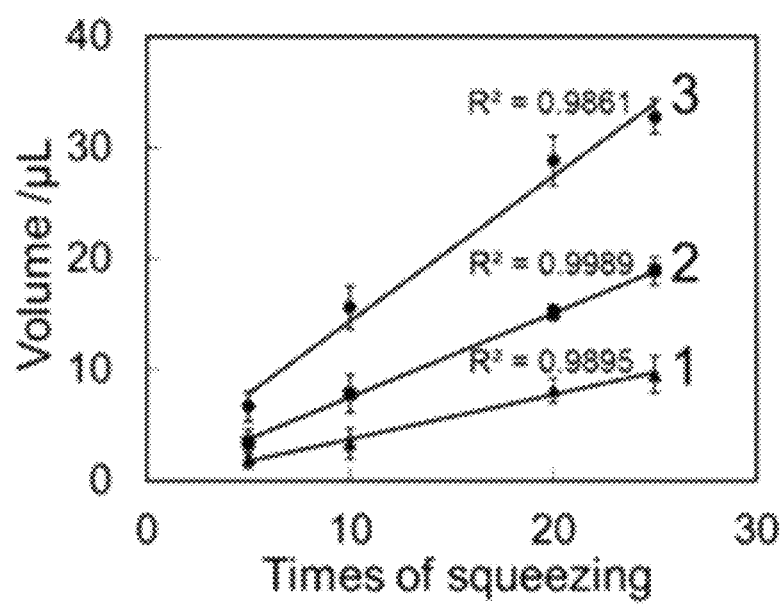
FIG. 7D shows the plot of total volume of delivered ethanol solution versus number of cycles of squeezing operation of microfluidic channels 1, 2 and 3.

In the present system, the squeezable-pump chambers can be filled without space, thus it is more capable of delivering volatile solvents than auto pipettes. To test the accuracy of liquid delivery, a series of chambers with fixed length but different widths as volume-determining chambers are fabricated. Each chamber is connected to a larger chamber, which serves as a supply reservoir, as shown in FIG. 7C. An external PDMS slab is used to squeeze liquid in the volume determining chambers into the channels, and weighed the liquid extruded from the channel outlet after a certain number of squeezing cycles. As shown in FIG. 7D, small amounts of volatile solvents is able to be delivered using the present plastic membrane chip.

Figure 9A:
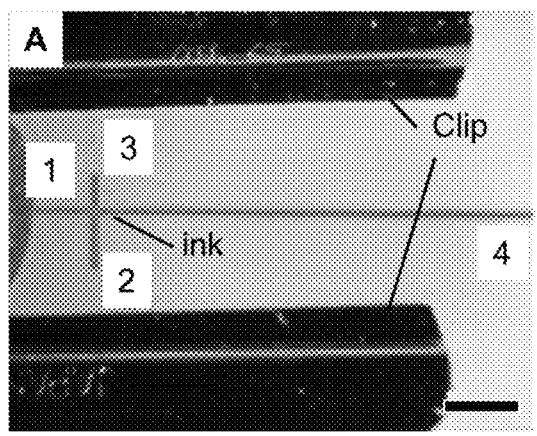
FIG. 9A shows the image of red ink that was pumped into the channel from inlet 1; channel 2 and channel 3 were blocked by two metal clips in a valving operation test. (Scale bars denote 5 mm).
Figure 9B:
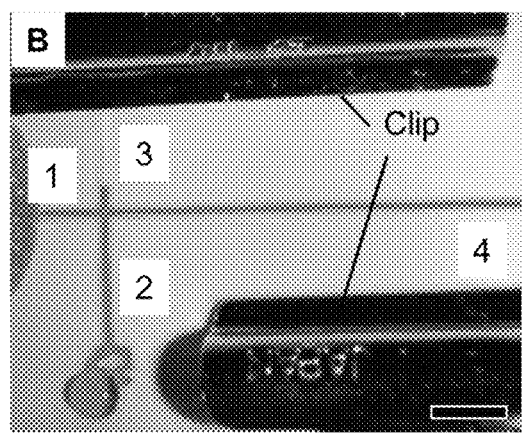
FIG. 9B shows channel 2 was unobstructed by removing the metal clip, while channel 3 was still blocked by a metal clip in a valving operation test. (Scale bars denote 5 mm).
Figure 9C:
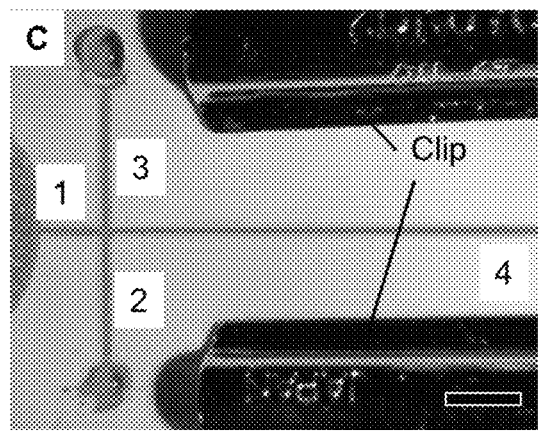
FIG. 9C shows channel 3 was unobstructed by removing the clip in a valving operation test. (Scale bars denote 5 mm).
Figure 9D:
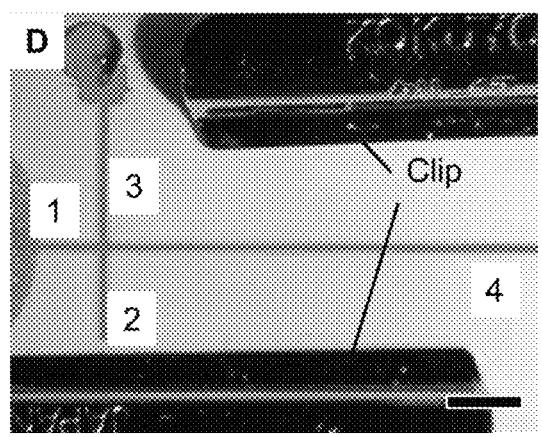
FIG. 9D shows channel 2 was blocked again while channel 3 was left unobstructed in a valving operation test. (Scale bars denote 5 mm).

Measurement of exact weight and volume of reagents is crucial in quantitative analysis. Microfluidic analytical system made of conventional materials, e.g. PDMS, often lead to inaccurate results because test reagents are often absorbed or evaporated due to porous structures of conventional microfluidic systems. Microfluidic chips prepared according to the present invention avoid these problems. Compare to conventional PDMS, the present plastic membrane is densely crosslinked. As such, reagents or small molecules are not trapped within the membrane, thus accuracy of the quantitative analysis is enhanced. The present plastic membrane is shown to precisely pump non-volatile liquids. The present invention fabricates microfluidic chips in very short time (as short as few seconds); statistical analysis reveals that the amplitude of inter-device error is similar to that of repeated operation on a same device, indicating that the devices could be used as disposable products for single-time use (Table 2). Table 2 represents the liquid delivered (mL) by the 4 chips prepared by the present method using the same mold. The results show that different chips delivered very similar amount of liquid, hence the present invention is high reproducible in preparing microfluidic chips. Meanwhile, it is also convenient to perform valve function on the membrane chips. As shown in FIGS. 9A to 9D, 500 µm wide cross channels are fabricated and red ink is pumped into the channel; the channels can be easily blocked or unblocked with external metal clips due to the flexibility of plastic films. Red ink is pumped into the channel from inlets 1; channel 2 and channel 3 are blocked by two external metal clips, (channel 4 is open for injection of ink) as shown in FIG. 9A. When channel 2 is unblocked by removing the clip and channel 3 is still blocked, the ink flows out from channel 2, as presented in FIG. 9B. When channel 3 is also unobstructed, the ink flows out from both channel 2 and channel 3 (FIG. 9C). FIG. 9D shows channel 2 is blocked again by clip and channel 3 is unblocked. The results indicate that the plastic film chips offer great convenience in fluid manipulation.

TABLE 2

Analysis of inter-chip reproducibility of fluid delivery

| chip1 | chip2 | chip3 | chip4 |
| --- | --- | --- | --- |
| 0.0020 | 0.0019 | 0.0018 | 0.0018 |
| 0.0022 | 0.0022 | 0.0020 | 0.0021 |
| 0.0023 | 0.0019 | 0.0023 | 0.0018 |

Figure 8:
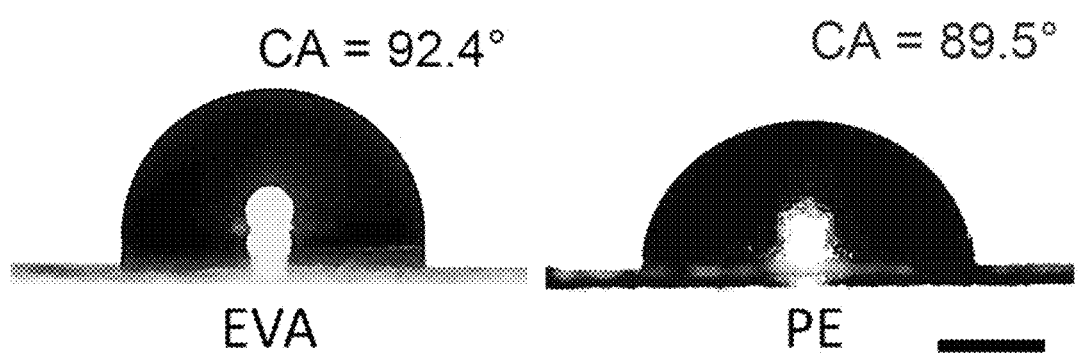
FIG. 8 shows advancing water contact angle (CA) on EVA and PE surfaces. Tests were conducted at 20° C. using deionized water. Scale bar is 1 mm.
Figure 10A:
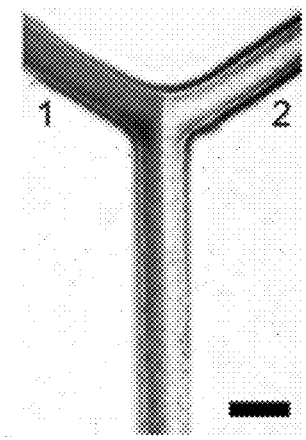
FIG. 10A shows the microscopic image of laminar flow formation where channel 1 and channel 2 represent injection of crystal violet solution and water, respectively.
Figure 10B:
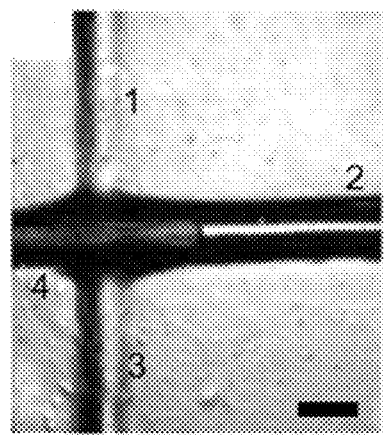
FIG. 10B shows the microscopic image of crystal violet solution and water infused from the channels 1 and 2 and connected channels 3 and 4, and the droplet formation (Scale bars are 500 μm).
Figure 10C:
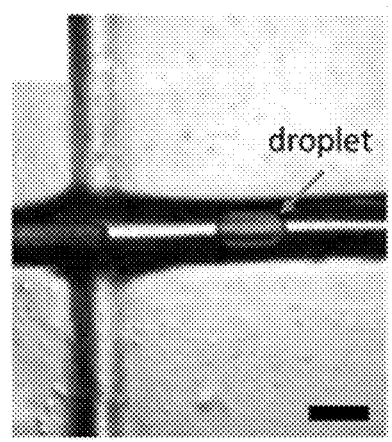
FIG. 10C shows the microscopic image of droplet formation in the channel 2 as indicated by an arrow (Scale bars are 500 μm).
Figure 10D:
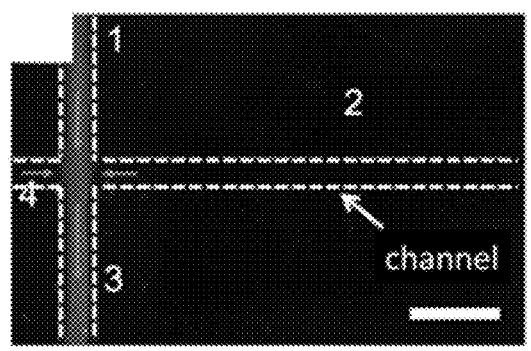
FIG. 10D shows the fluorescence image of on-chip electrophoresis. The fluorescent solution was introduced to the channel 1 in test of Capillary electrophoresis (CE) (arrows in the channels show the direction of electroosmotic flow).
Figure 10E:
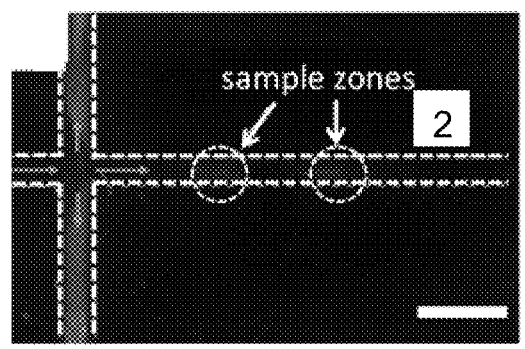
FIG. 10E shows the fluorescence image of on-chip electrophoresis. Two samples were eluted in channel 2 in test of Capillary electrophoresis (CE) (arrows in the channels show the direction of electroosmotic flow).

Considering that the profile of the channel prepared using current method (generally curved shape) is different from that of the commonly used PDMS channels (usually rectangular shape), the capability of the present membrane chips in some key functions pertinent to contemporary microfluidic applications is validated. First, the inventors measured water contact angel on the PE membrane (channel roof and side walls) and the EVA surface (bottom of the channel), and found both of layers are slightly less hydrophobic compared with PDMS (FIG. 8). A stable laminar flow of crystal violet solution and water is established inside a membrane channel (FIG. 10A). Then, the inventors formed droplets and carried out capillary electrophoresis (CE) separation on the chips. As shown in FIG. 10B, silicone oil is pumped into channels 1 and 3, and dyed water is pumped into channel 4. Droplets are formed in channel 2 (FIG. 10C). FIG. 10D present the CE separation of fluorescein and Rhodamine 6G (R6G). It is found that the electroosmotic flow in plastic channel of the present invention is insufficient for CE separation; in this case, sodium dodecyl sulfate (SDS) solution is used to assist the electrophoresis, and demonstrates satisfactory speed of migration of the CE bands, which are indicated in FIG. 10E.

Figure 12:
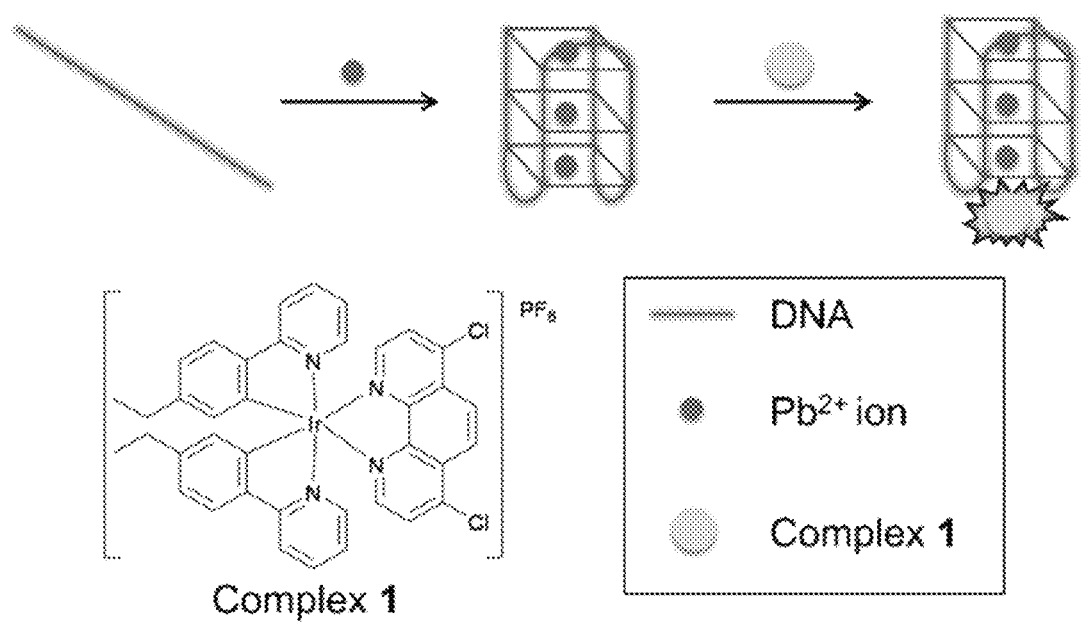
FIG. 12 shows the schematic illustration of the formation of G-quadruplex in the presence of $Pb^{2+}$ ions and the structure of luminescent switch-on probe Complex 1.

The present invention also provides a simple, convenient, and cost-efficient method for detecting lead ions in water. The method for detecting lead ions in water comprises providing a membrane chip prepared as described by the present application without any external pump, which demonstrated the implementation of the technology developed in current work in real world applications. The contamination of lead in drinking water has been a common environmental problem with case reports all around the world. A cost-efficient method is highly demanded for point-of-care tests of lead in water. The present detection method uses a luminescent iridium(III) probe (Complex I, FIG. 12) the inventors reported previously (G-quadruplex-based logic gates for Hg and Ag ions employing a luminescent iridium (III) complex and extension of metal-mediated base pairs by polymerase; J. Mater. Chem. B, 2015, 3, 4780-4785). The principle of detection is that lead ions promote single-stranded DNAs to form G-quadruplex conformation, and lead to luminescence emission of the iridium(III) probe. The membrane chip of the present detection method requires (1) inject predetermined amount of sample for testing; (2) effectively mix the sample with reagents; (3) prevent sample from evaporating during incubation; and (4) to retrieve the reagents. As no auto-pipette or external pump is required, and the chip is inexpensive. the method is friendly to none-expert consumers and resource-limited situations.

Figure 11A:
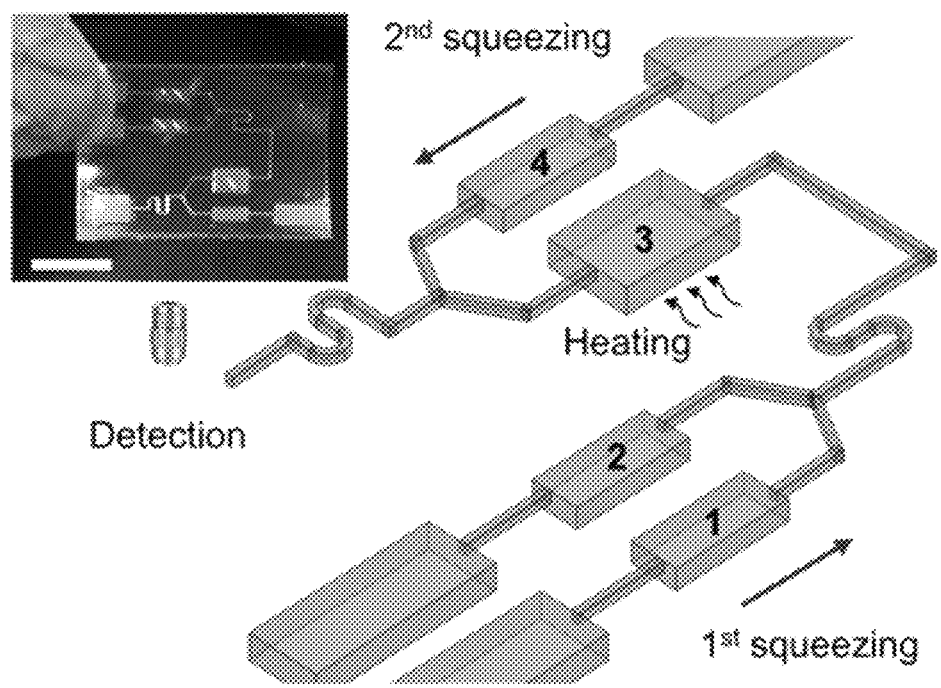
FIG. 11A shows the design of the chip for lead detection. Inset: as-prepared plastic membrane chip.
Figure 11B:
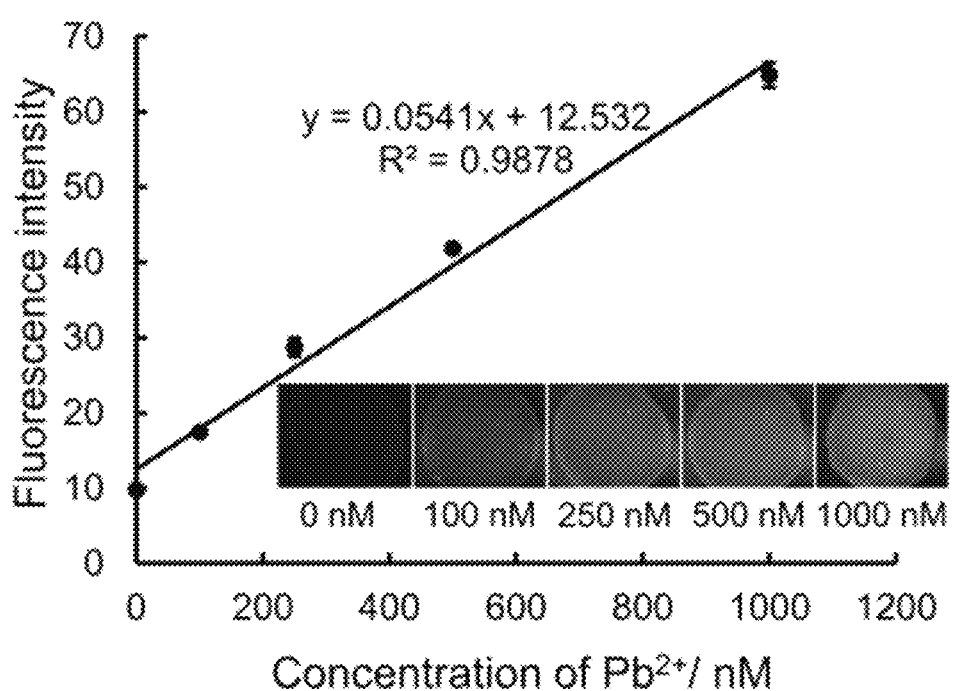
FIG. 11B shows the relationship between the fluorescence intensity and $Pb^{2+}$ ion concentration. Inset: fluorescence images of corresponding concentrations. Scale bar is 10 mm.

As shown in FIG. 11A, the chip includes chambers for loading solutions and infusing samples, as well as channels for mixing solutions. First, the water sample (to be detected for lead ion) and the DNA solution are loaded into the corresponding reservoirs, and then injected into the two chambers 1 and 2 at the same time by squeezing; the solutions are mixed when passing through a first mixing region of channels and then introduced into an incubation chamber 3. Different patterns of channels may be used as long as solutions of the two chambers can be mixed. While the mixed solution is in chamber 3, the chip is heated to 95° C. for 5 min to form G-quadruplex/$Pb^{2+}$ complex. Chamber 4 contains the luminescent probe solution. The G-quadruplex/$Pb^{2+}$ solution in chamber 3 and the luminescent probe solution in chamber 4 are forced out of the perspective chambers and pass on to a second mixing region of channels; the resulted mixture is delivered to a detection zone, and the luminescence signal is recorded under microscope. As only measurement of the luminescence intensity is required, the microscope used in current demonstration could be replaced with a less expensive optical sensor in real implementations. The detection limit of the present method is ~30 nM (FIG. 11B), which fulfils the requirement for drinking water safety test. The present detection process only takes less than 10 mins with two simple squeezing operations. Reproducibility test shows that the membrane chip may be used for other analytical purposes. A group of blinded measurements are performed and confirmed the reliability of the present method. The membrane microfluidic chip of the present application is shown to be well suitable for portable and disposable uses without the need of laboratory tools such as auto pipette and syringe pump. The present plastic membrane chips can be used for broad applications in point-of-care analysis.

EXPERIMENTAL

1. Preparation of Teflon PFA Mold

The present application provides a method to conveniently fabricate whole-Teflon microfluidic chip with similar ease as the standard soft lithography. The PFA mold for use in the present method may be prepared as described below. Desirable microchannel pattern is printed onto a transparent film. The film is used as mask in photolithography to create negative photoresist (SU8-2050, Microchem, USA) templates on silicon wafers. Other templates with dimension larger than 100 micrometer are printed directly by a 3D printer (Miicraft, Hsinchu, Taiwan). Then the patterns on silicon wafers or 3D templates are transferred using a PDMS intermediate mold into a piece of Teflon perfluoroalkoxy (Teflon PFA, Yuyisong, China). A thin layer (about 500 μm thick) of PDMS precursor is casted by spin-coating at 400 rpm using a formula of 5:1 of prepolymer:curing agent (Momentive RTV 615, USA) against the negative template, followed by heating in an 80° C. oven for 1 h to cure the PDMS. After the PDMS is cured, the PDMS positive master is peeled off and tiled it on a glass slide and placed the stack in a 250° C. oven for 1 h. After this baking process, the PDMS is stuck to the glass slide irreversibly. Finally, Teflon PFA sheet is molded by the PDMS masters on a thermal-compressor (TM101, Xintaiming, China) for 3 minutes at 270° C.

2. One-Step Thermal-Bonding of Plastic Microfluidic Chip

First, a PFA mold is fixed on the top substrate of a hot embosser which is preheated to 130° C. Two pieces of thin plastic membranes, a 40 μm thick low density polyethylene (LDPE) membrane (Lings, China) as the top layer (thermal expanding membrane) and a 15 μm thick ethylene vinyl acetate (EVA) (adhesive membrane) coated 100 μm thick polyethylene terephthalate (PET) layer (Deli, China) as the thermal resistant membrane, are placed on the bottom compressible substrate (FIG. 1). A 500 μm thick PDMS membrane was sandwiched between the bottom substrate of the embosser and the thermal resistant membrane, which helps to distribute the pressure evenly to the plastic membranes. During the thermal-bonding process, the top substrate moves down and pressed the membranes for 10 seconds. The pattern on the PFA negative mold is transferred to the membrane and at the same time microchannels were formed. Finally, the embosser moved up and separated from the membrane chip after pressing.

3. Investigation of the Effects of Bonding Temperature, Duration of Pressing, Channel Width, and Roof Thickness to the Section Profile of the Generated Channels To investigate the effects of bonding temperature and duration of pressing in formation of channels, a PFA mold with 800-μm wide microchannels is used as stamp to produce a series of plastic microchips under different conditions, and the peak heights as well as widths of the generated channels are measured and used for calculating the ratio of height-to-width. the temperature of the top substrate of the embosser is fixed at 131° C. and adjusted the pressing duration from 8 up to 16 seconds at a time interval of 2 seconds. Then, the temperature of the top substrate from 123 to 131° C. (an increment of 2° C.) is investigated under a fixed pressing time of 10 seconds to thermal-bond the plastic membranes. The pressure used is 0.6 MPa.

To further understand the dependence of channel profile to the width of the channel and the thickness of the channel roof, a series of molds with different widths (1500 μm, 1000 μm, 600-m, and 300 μm) and PE membranes with different thickness (75 μm, 40 μm, and 20 μm) are used to fabricate plastic membrane chips, and measured the ratios of height-to-width of the channels. The bonding condition is 0.6 MPa, 126° C., and 10 seconds of pressing.

4. Channel Fouling Test

The plastic membrane channel of the present invention and PDMS channel with 0.1 mg/mL Rhodamine 6G (R6G, obtained from Sigma-Aldrich, Hong Kong, China), 10 μM labelled single-stranded oligonucleotide (5'-Cy3-$T_3GTATA_4G_4T_2G_3TG_3T_3ATACA_3T_2$-$A_2T_2A_2TAT_2GTATG_2TATAT_3AT_2A_2$-3', obtained from Techdragon Inc. Hong Kong, China), and 0.1 mg/mL Green fluorescence protein (GFP) aqueous solution, respectively, and then are incubated at room temperature for 10 min. Fluorescence images are taken by microscope (Eclipse Ts2R, Nikon) before and after rising channels with 0.5 mL water which is more than 100 times of the volume of the microchannel. Fluorescence intensity is quantified by ImageJ software (V1.48, National Institutes of Health, Bethesda, Md.).

5. Peristaltic Pump Operation

To demonstrate that the channel roof (made of LDPE) can automatically restore to its original shape after squeezing, a tree-like network of channel is filled with aqueous solution of crystal violet dye (purchased from Tianjin Bodi Co., LTD, China), and then the channels are wiped using an external PDMS slice to remove the bubbles from the corners of the channels (FIGS. 7A and 7B). Another test is conducted to demonstrate precise delivery of volatile solvent using the as-prepared flexible plastic chip based on peristaltic pumping (FIGS. 7C and 7D). For this test, a series of channels with volume-determining chambers of different volumes are used. 75% ethanol (v/v) in water is injected into the inlet of each channel to fill the reservoir chamber and the downstream volume-determining chamber. The liquid is then squeezed out of the volume-determining chamber and collected by a small vial on an analytical balance (Fisher Scientific, US, with sensitivity of 0.1 mg). The vial is filled with water to reduce evaporation of the collected solvent. The squeezing is repeated 5 times before a reading from the balance was taken, and the weight of delivered solvent is calculated by the increment of reading of the balance. After each time of squeezing, the volume-determining chamber is automatically refilled by the connected reservoir chamber.

6. Valving Operation

Red ink (purchased from Tianjin Bodi Co., LTD, China) is injected into the 500 μm wide cross-design microchannel from inlet 1, and outlets 2, 3 and 4 are blocked or unblocked by metal clips to valve the ink flow to different channels (FIG. 9).

7. Laminar Flow and Droplet Formation

To establish laminar flow inside the membrane channels, crystal violet solution and water are infused into two arms of a Y-shape channel at 2 μL/min each. Droplets generation test is conducted on a plastic membrane chip prepared according to the present application containing a cross-shape microchannel, 500 μm in width. Silicone oil (purchased from Sigma-Aldrich) and crystal violet dye in 0.5 wt. % sodium dodecyl sulphate (SDS, purchased from Sigma-Aldrich) aqueous solution are introduced to the short arm and the long arm of the cross channel at flow rates of 50 μL/min and 25 μL/min, respectively. Droplets are formed in the long channel. Images are captured by a microscope (ML-30, China) equipped with Infinity 2 digital camera (Lumenera Corporation, Canada).

8. Capillary Electrophoresis Separation

Capillary electrophoresis (CE) is performed on a membrane chip with cross-shape channel design (FIG. 10C). Two shorter arms of the channel, each 5-mm in length, are used for injection. The separation is conducted in a 20-mm arm of the microchannel. The buffer used is 10 mM borax in 0.2 wt. % SDS solution; the sample is a mixture of 0.1 mM fluorescein and 0.1 mM Rhodamine 6G. The sample is electrokinetically (pinch mode) injected into the sample loading channel, and separated in the separation channel under voltage of 150 V/cm controlled by a custom made programmable high-voltage power supply. The separation process is inspected under fluorescence microscope.

9. Lead(II) Ions Detection 1.5-μL single-stranded oligonucleotide (obtained from Techdragon Inc. Hong Kong, China) (PS2.M: 5'-$GTG_3TAG_3CG_3T_2G_2$-3', 10 μM) and 2.5 μL different concentrations of $Pb^{2+}$ ions (purchased from Sigma-Aldrich) in Tris buffer (purchased from Sigma-Aldrich) (10 mM Tris-HAc, pH 7.2) are introduced into the chambers 1 and 2, respectively. The two parallel chambers are squeezed at the same time and then mixed on-chip in the next chamber 3 with the assist of microchannel structure. The chip is then heated to 95° C. for 5 min, and cooled to 0° C. subsequently on a custom thermal stage to ensure the formation of G-quadruplex. (FIG. 12) In the detection measurement, a solution of 1.5-μL complex 1 (prepared using literature methods) (5 μM) is added into the chamber 4 and mixed with the annealed G-quadruplex/$Pb^{2+}$ solutions by squeeze-pumping. The luminescence emission intensity at 580-730 nm is recorded at 25° C. under microscope (ML-30, China) with excitation light of 365 nm wavelength. The images taken under fluorescence microscope are analyzed using ImageJ software to extract the information of luminescence intensity.

CONCLUSIONS

The present application provides a one-step method for rapid fabrication of plastic membrane-based microfluidic chip with very low cost (less than $0.02 per chip). In the present method, a heated negative mold is used as a stamp to mass-produce plastic membrane microfluidic chips at a rate of 12 s per chip. A three-layer hybrid membrane configuration is employed to manufacture the channels in the present one-step method, including a thermal expanding layer, a thermal adhesive layer and a thermal resistant layer. The channels are formed by rising of the thermal expanding layer at region where it is not pressed by the heated mold and tight bonding of the three layers at where it is pressed by the mold. The present method demonstrates an alternative to the conventional strategy of microchannel fabrication that includes two steps, generation of channels on a substrate and then sealing them. The chips manufactured by the present method performs typical microfluidic functions such as valving, laminar flow, droplets generation, electrophoretic separation. Chips prepared according to the present method also offers additional functions such as on-chip pumping and controlled delivery of desired volume of liquid. The chips exhibit anti-fouling property against Rhodamine 6G, DNA molecules, and GFP. The membrane chip prepared according to the present invention is capable to detect lead ions in water samples. The present method permits a low-cost, rapid and user-friendly on-site analysis in resource-limited environment. The method presented here holds great promise for benefiting the commercialization of microfluidic technologies.

INDUSTRIAL APPLICABILITY

Accordingly, the first objective of the presently claimed invention relates to a method for fabricating flexible microfluidic chips with plastic membranes. In particular, the present invention provides a single-step method for microchannel fabrication of microfluidic chips in a fast and cost-efficient manner.

The invention claimed is:

1. A method to manufacture a microfluidic chip comprising providing a negative mold; providing a thermal expanding membrane, a thermal adhesive membrane and a thermal resistant membrane; layering the three membranes on a compressible substrate, wherein the thermal resistant membrane is layered on top of the compressible substrate and the thermal expanding membrane is layered on top of the thermal resistant membrane with the thermal adhesive membrane sandwiched between the thermal expanding and thermal resistant membranes; heating the negative mold to a temperature sufficient to seal the three membranes; and contacting the heated negative mold with the thermal expanding membrane at a pressure sufficient to seal the three membranes, wherein the negative mold holds a pattern negative to the microfluidic chip to be manufactured and has a melting point higher than the membranes to be sealed, wherein the thermal expanding membrane expands to form channels in regions that is not in contact with the heated negative mold, and wherein the thermal expanding membrane is in contact with the heated negative mold for at least 5 seconds, but not more than 25 seconds.

2. The method according to claim 1 wherein said compressible substrate is selected from the group consisting of cis-1,4-polyisoprene natural rubber, trans-1,4-polyisoprene gutta-percha, synthetic polyisoprene, polybutadiene, chloroprene rubber, polychloroprene, neoprene, baypren, butyl rubber, halogenated butyl rubber, styrene-butadiene rubber, nitrile rubber, hydrogenated nitrile rubber, ethylene propylene rubber, ethylene propylene diene rubber, epichlorohydrin rubber, polyacrylic rubber, silicone rubber, fluorosilicone rubber, fluoroelastomers, perfluoroelastomers, polyether block amides, chlorosulfonated polyethylene and ethylene-vinyl acetate.

3. The method according to claim 1, wherein said compressible substrate is a cured polydimethylsiloxane (PDMS) of 1-30: 3-1 prepolymer to a curing agent.

4. The method according to claim 3, wherein said compressible substrate is a 20:1 cured PDMS.

5. The method according to claim 1 wherein said pressure sufficient to seal the three membranes is at least 0.6 MPa.

6. The method according to claim 1 wherein said temperature sufficient to seal the three membranes is 100° C.-200° C.

7. The method according to claim 6, wherein said temperature is 122° C.-132° C.

8. The method according to claim 1, wherein the heated negative mold is in contact with the membranes for 8 seconds to 16 seconds.

9. The method according to claim 1, wherein the thermal expanding membrane is selected from LDPE, polypropylene and polyvinyl chloride.

10. The method according to claim 1, wherein the thermal adhesive membrane is selected from EVA, polyethylene, poly(methyl methacrylate) and polylactic acid.

11. The method according to claim 1, wherein the thermal resistant membrane is selected from PET, polycarbonate, polyether sulfone, polyoxymethylene, polyether ether ketone, polyetherimide, polyphenylene sulfide and acrylonitrile butadiene styrene.

12. The method according to claim 1, wherein the negative mold is selected from PFA, polytetrafluoroethylene, fluorinated ethylene propylene, ethylene tetrafluoroethylene, polyvinylidene fluoride, polyamides and polyether ether ketone.

13. The method according to claim 1, wherein the thermal expanding membrane has a thermal expansion coefficient of approximately $250 \times 10^{-6}$/° C., the thermal resistant membrane has a melting point of above 200° C. and a thermal expansion coefficient of approximately $70 \times 10^{-6}$/° C. and the thermal adhesive membrane has a melting point lower than the thermal resistant membrane.

* * * * *